United States Patent
Jang et al.

(10) Patent No.: US 7,911,089 B2
(45) Date of Patent: Mar. 22, 2011

(54) FAN MOTOR FOR REFRIGERATOR

(75) Inventors: Jeong Cheol Jang, Gwangju (KR); Gyeong Su Park, Gwangju (KR)

(73) Assignee: New Motech Co., Ltd., Gwangju (KR)

( * ) Notice: Subject to any disclaimer, the term of this patent is extended or adjusted under 35 U.S.C. 154(b) by 0 days.

(21) Appl. No.: 12/911,823

(22) Filed: Oct. 26, 2010

(65) Prior Publication Data

US 2011/0037328 A1 Feb. 17, 2011

Related U.S. Application Data

(63) Continuation of application No. PCT/KR2009/000674, filed on Feb. 12, 2009.

(30) Foreign Application Priority Data

Sep. 25, 2008 (KR) .......... 10-2008-0094375

(51) Int. Cl.
 *H02K 1/04* (2006.01)
(52) U.S. Cl. .............. 310/43; 310/89; 310/90
(58) Field of Classification Search ........... 310/43, 310/71, 67 R, 89–90
See application file for complete search history.

(56) References Cited

U.S. PATENT DOCUMENTS

| | | | | |
|---|---|---|---|---|
| 6,010,318 | A * | 1/2000 | Li | 417/423.13 |
| 6,318,976 | B1 * | 11/2001 | Hsieh | 417/423.12 |
| 6,462,443 | B2 * | 10/2002 | Horng | 310/68 B |
| 6,707,199 | B2 * | 3/2004 | Chou et al. | 310/90 |
| 6,943,471 | B2 | 9/2005 | Toyokawa et al. | |
| 2003/0067243 | A1 * | 4/2003 | Hollenbeck et al. | 310/254 |
| 2003/0222522 | A1 * | 12/2003 | Chang et al. | 310/90 |
| 2004/0256933 | A1 | 12/2004 | Toyokawa et al. | |
| 2007/0284954 | A1 * | 12/2007 | Lin et al. | 310/58 |
| 2009/0189492 | A1 * | 7/2009 | Horng et al. | 310/67 R |

FOREIGN PATENT DOCUMENTS

| | | |
|---|---|---|
| JP | 2000-027796 | 1/2000 |
| JP | 2000-041370 | 2/2000 |
| JP | 2005-020802 | 1/2005 |

\* cited by examiner

*Primary Examiner* — Thanh Lam (74) *Attorney, Agent, or Firm* — Sherr & Vaughn, PLLC

(57) ABSTRACT

The present invention relates to a fan motor is for forced circulation of cool air in the refrigerator and comprises a molding unit, a shaft bearing unit, a rotor and an end cap. The molding unit comprises a stator having a shaft bearing unit mounting hole in the center thereof and core teeth which protrude radially outward so that a coil is wound thereon; and a circuit board having a circuit and a device which are electrically connected to the coil of the stator. The shaft bearing unit is inserted and fixed in the shaft bearing unit mounting hole. The rotor has a magnetic ring formed on the inner surface of a cup-shaped rotor housing, and a rotating shaft is fixed at the bottom center of the rotor housing. The end cap whose edge is connected to a side wall of the molding unit covering the rotor.

17 Claims, 7 Drawing Sheets

FAN MOTOR FOR REFRIGERATOR

CROSS REFERENCE TO PRIOR APPLICATIONS

This application is Continuation of PCT International Application No. PCT/KR2009/000674 (filed on Feb. 12, 2009) designating the United States, which claims priority to Korean Patent Application No. 10-2008-0094375 (filed on Sep. 25, 2008), which are all hereby incorporated by reference in their entirety.

TECHNICAL FIELD

The present invention relates to a fan motor for a refrigerator, more specifically to the fan motor with an outer rotor which is compact and has sufficient output because a stator is integrally molded thereon and a rotor is installed outside the stator.

BACKGROUND ART

Generally, due to the fact that a fan motor is mounted inside the refrigerator in order to make forced circulation of air cooled in a heat exchanger, the motor needs to be waterproof for preventing moisture condensed in accordance with temperature fall in the refrigerator from permeating into the motor.

Figure 7:
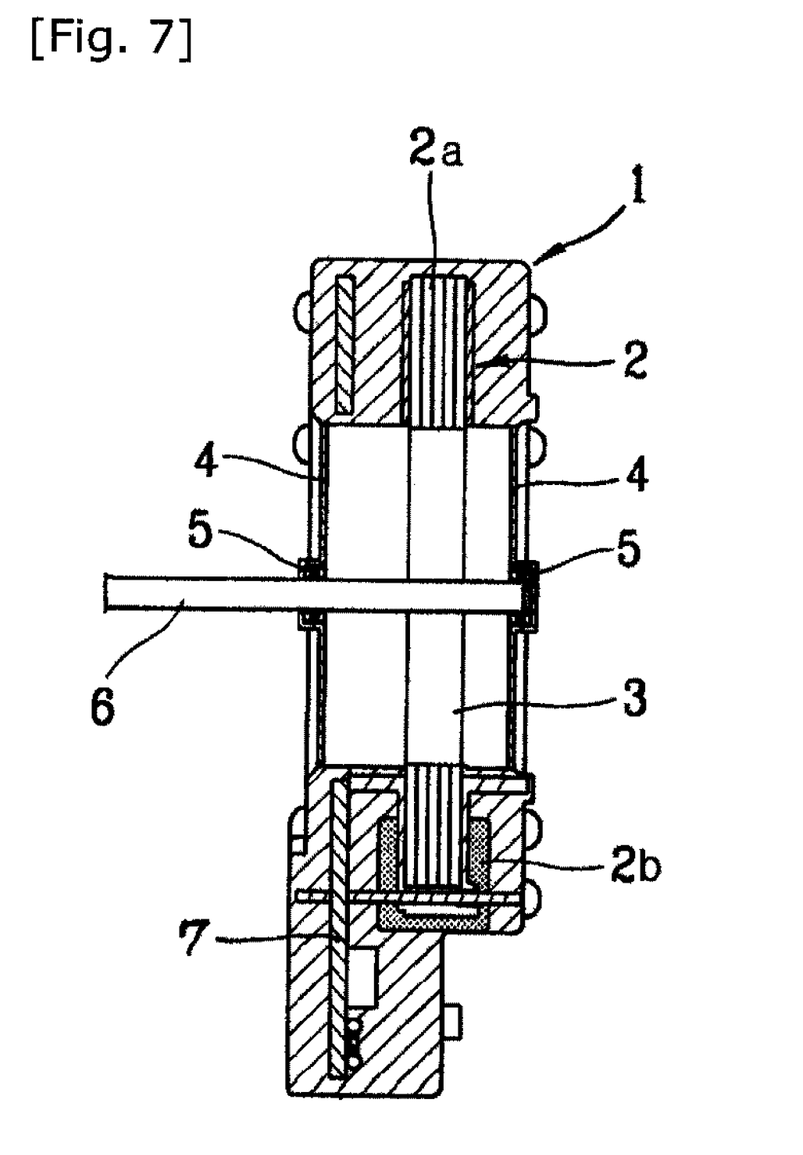
FIG. 7 shows a cross-sectional view of a fan motor for a refrigerator according to the prior art.

The conventional motor is illustrated referring to FIG. 7 which shows lateral cross-sectional view of the motor according to the prior art.

As shown the figure, the fan motor comprises a stator 2, a rotor 3, a circuit board 7, a rotation shaft 6, a bearing 5 and end brackets 4. The stator 2 is combined with a bobbin 2b with coil wound. The bobbin is on the side of a stacked core 2a in which a plurality of lamination sheets are stacked so as to have constant thickness. The rotor 3 has a cylinder-shaped permanent magnet inserted through the stacked core 2a. The circuit board 7 is placed toward the side of the stator 2 and makes magnetic fields around the stacked core 2a by applying electric currents to the coil and rotating the rotor 3. The rotation shaft 6 is forcibly fixed through the center of the rotor 3 and transmits driving forces. The bearing 5 is to enable the rotating shaft 6 to rotate at a fixed position. The end brackets 4 are combined at both sides of the stacked core 2a respectively.

The conventional fan motor in the refrigerator is insulated by molding and is also capable of waterproof against the moisture because it is made by an insert molding method applied over the stator 2 and the circuit board 7.

This kind of fan motor is usually put in a casing for the motor and is fixed on the inner side wall of the refrigerator. Thus, this motor has a compact size to be accepted into the casing and has a torque enough to make air circulation in the refrigerator.

In particular, the enough torque is more important because refrigerators these days are being much larger. Generally, the torque of the motor is proportional to a diameter of a rotor assuming that the other conditions are same. The fact that the conventional motor is classified to "a motor of an inner rotor" in which the rotor 3 rotates inside the stator 2, results in an increased size of the motor in case that the rotor has bigger size to get the enough torque.

The bigger size of the motor gives rise to increased costs due to spending more materials such as molding resin and iron sheets. Also, the motor takes up more space to be mounted in the refrigerator.

DISCLOSURE OF INVENTION

Technical Problem

An object of the present invention devised to solve the problem lies on providing a fan motor for a refrigerator that can cut down manufacturing costs by reducing amounts of materials used, provide a simple motor structure, be easily fabricated and be significantly better for waterproof.

Technical Solution

The object of the present invention can be achieved by providing a fan motor for a refrigerator. The fan motor is for forced circulation of cool air in the refrigerator and comprises a molding unit, a shaft bearing unit, a rotor and an end cap. The molding unit comprises a stator having a shaft bearing unit mounting hole in the center thereof and core teeth which protrude radially outward so that a coil is wound thereon; and a circuit board having a circuit and a device which are electrically connected to the coil of the stator. The stator and the circuit board having a terminal socket are integrally molded out of resin and ends of the core teeth are exposed outwardly in the radial direction. A base is formed on one side of the stator, a shaft insertion hole connected to the shaft bearing unit mounting hole is formed in the center of the base, a side wall is formed protrusively from the edge of the base to surround the ends of the core teeth with a gap, and a terminal of the terminal socket is exposed outside the side wall. The shaft bearing unit is inserted and fixed in the shaft bearing unit mounting hole. The rotor has a magnetic ring formed on the inner surface of a cup-shaped rotor housing, and a rotating shaft is fixed at the bottom center of the rotor housing. The side wall of the rotor housing is inserted in the gap between the side wall of the molding unit and the ends of the core teeth of the stator so that the magnetic ring is positioned opposite to the ends of the core teeth of the stator with a gap. The rotating shaft penetrates through the shaft insertion hole and thereby the rotor is supported by the shaft bearing unit. The end cap whose edge is connected to the upper part of the side wall of the molding unit covering the rotor.

According to the present invention, the stator has a stacked core made by stacking a plurality of lamination sheets with the core teeth protruded outward radially. The stacked core is surrounded by an insulator and the coil is wound on the core teeth surrounded by the insulator.

A fixing pin is formed downward at the bottom of the insulator and a fixing hole is formed on the circuit board in order for the fixing pin to be inserted. The stator and the circuit board are integrally resin molded with the fixing pin inserted into the fixing hole.

The insulator comprises an upper insulator and a lower insulator and the upper insulator and the upper insulator covers the stacked core upward and downward respectively.

The insulator may further comprises a terminal pin which is electrically connected to the coil and is protruded downward; and the circuit board further comprises a terminal pin hole for the terminal pin to be inserted and for electrical connection with the circuit of the circuit board. The stator and the circuit board are integrally resin molded with the terminal pin inserted into the terminal pin hole.

The shaft bearing unit may further comprises a bearing housing having a bearing mounting hole penetrated vertically at the center; and a bearing inserted and fixed into the bearing mounting hole of the bearing housing.

The shaft bearing unit further comprises an oil felt inserted and fixed into the bearing mounting hole from the upper direction of the bearing.

The bearing mounting hole has an wider opening at the upper part and a narrower opening at the lower part. The shaft bearing unit may further comprises a housing cap which is combined at the upper part covering the upper opening of the bearing mounting hole.

A fixing pin is protruded and formed on one surface of the upper of the bearing housing and the bottom of the housing cap. And a fixing hole for the fixing pin to be fixed forcibly formed on the other surface of the upper of the bearing housing and the bottom of the housing cap.

A rotation prevention protrusion is formed and elongated vertically on one of the inner surface of the bearing mounting hole and the outer surface of the bearing. A rotation prevention channel is formed and elongated vertically for engaging the rotation prevention protrusion on the other of the inner surface of the bearing mounting hole and the outer surface of the bearing.

A rotation prevention protrusion is formed and elongated vertically on one of the inner surface of the shaft bearing unit mounting hole and the outer surface of the bearing housing. A rotation prevention channel is formed and elongated vertically for engaging the rotation prevention protrusion on the other of the inner surface of the shaft bearing unit mounting hole and the outer surface of the bearing housing.

The side wall of the rotor housing comprises an engaging end for the magnetic ring to be hung and engaged.

A shaft fixing hole is formed at the bottom center of the base of the rotor housing. The edge of the shaft fixing hole is drawing-processed in one direction. The rotating shaft is inserted and fixed forcibly into the shaft fixing hole.

A jig pin hole is formed on the base of the rotor housing.

The end cap is combined with the molding unit by the upper edge of the side wall of the molding unit being inserted into the engaging side wall whose end is bent.

A shaft end receptive concave is formed at the bottom center of the end cap and accepts the protruded end part of the rotating shaft.

A shaft end bearing washer is accepted and mounted in the shaft end receptive concave for supporting the end of the rotating shaft.

Advantageous Effects

The present invention, a fan motor for a refrigerator, enables cut down manufacturing costs by reducing amounts of materials used, provide a simple motor structure, be easily fabricated and be significantly better for waterproof.

REFERENCE NUMBERS IN THE DRAWINGS INDICATE 10 molding unit
11 stator
111 stacked core
111a core teeth
111b shaft bearing unit mounting hole
111c rotation prevention channel
112, 113 lower and upper insulators
112a fixing pin
112b terminal fixing protrusion
112c terminal pin
113 coil
12 circuit board
121 device
122 terminal socket
123 center hole
124 fixing pin hole
125 terminal pin hole
13 base
14 side wall
20 shaft bearing unit
21 bearing housing
211 bearing mounting hole
212 rotation prevention protrusion
213 forced insertion protrusion
22 bearing
23 oil felt
24 housing cap
241 forced insertion hole
30 rotor
31 rotor housing
32 magnetic ring
33 rotating shaft
40 end cap
41 side wall
42 shaft end receptive concave
43 shaft end bearing washer

BEST MODE FOR CARRYING OUT THE INVENTION

The details are described hereinafter with reference to the drawings which show an embodiment of the present invention.

Figure 1:
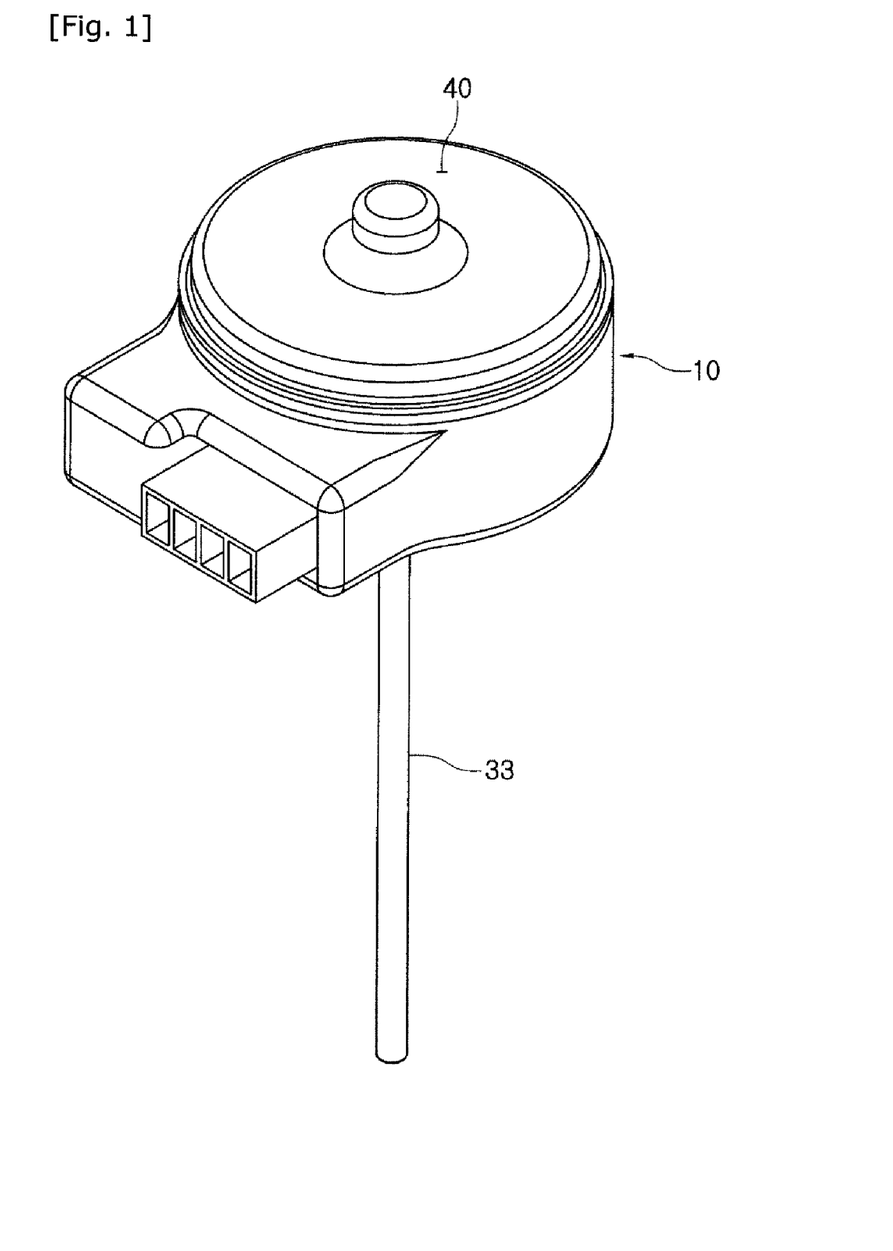
FIG. 1 illustrates a perspective view of a fan motor for a refrigerator according to an embodiment of the present invention.
Figure 2:
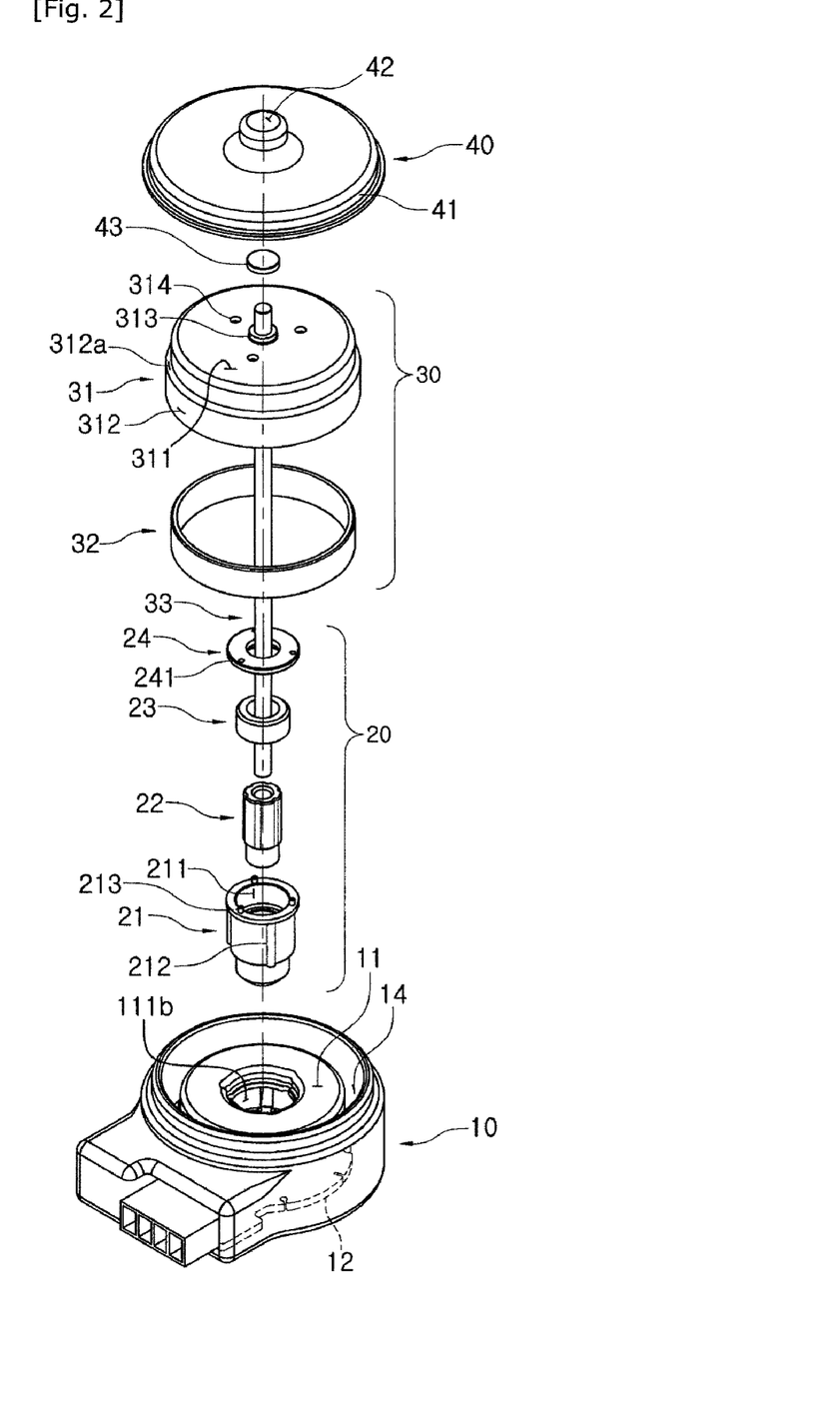
FIG. 2 illustrates a disassembled perspective view of a fan motor for a refrigerator according to an embodiment of the present invention.
Figure 3:
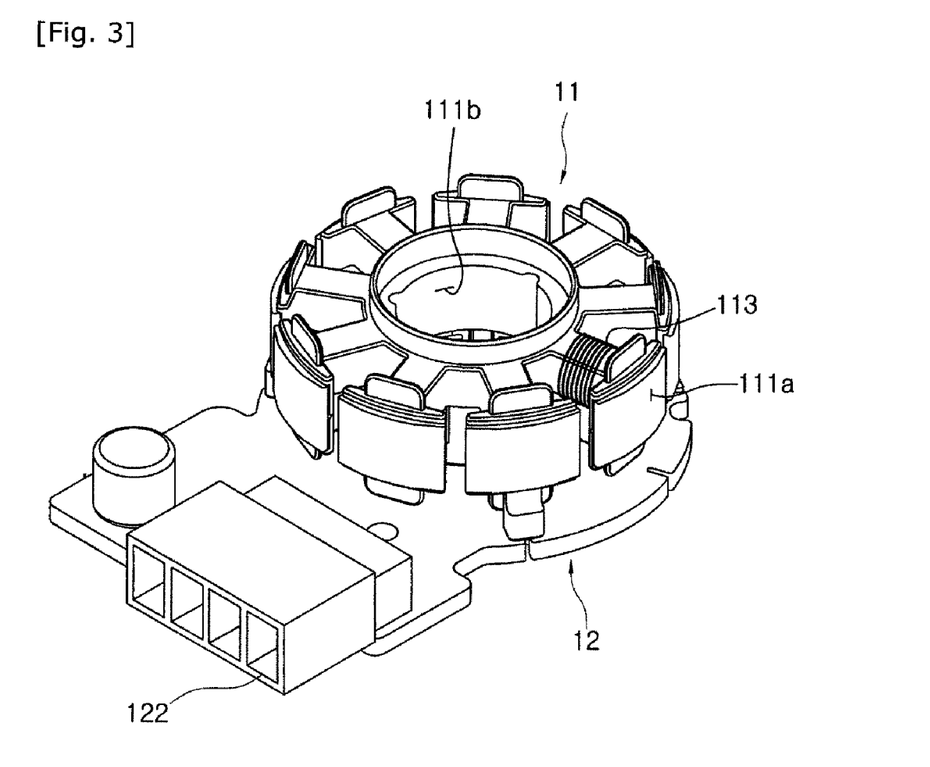
FIG. 3 illustrates a perspective view of a form that a stator made by insert molding for a molding unit, and a circuit board are assembled according to an embodiment of the present invention.
Figure 4:
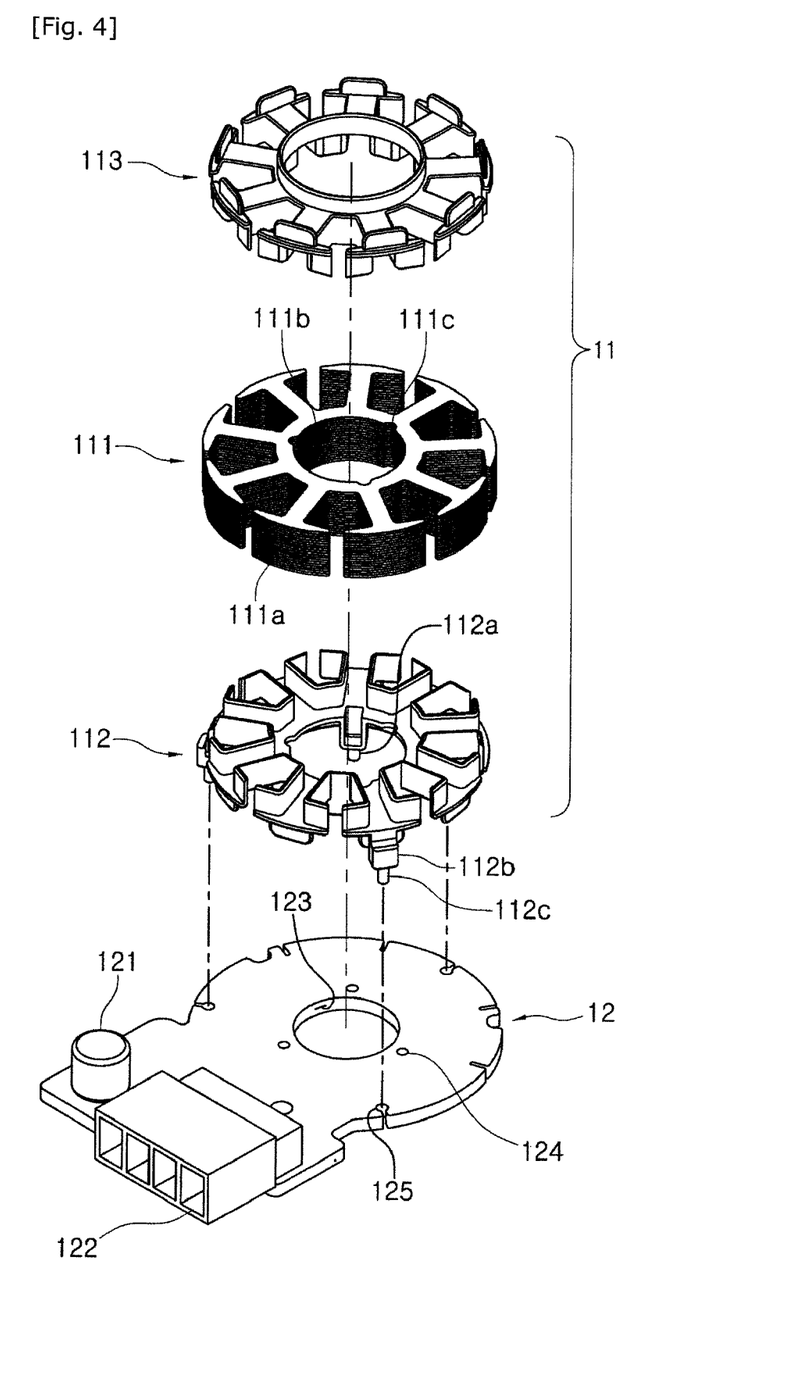
FIG. 4 illustrates a disassembled perspective view of a form that a stator made by insert molding for a molding unit, and a circuit board are assembled according to an embodiment of the present invention.
Figure 5:
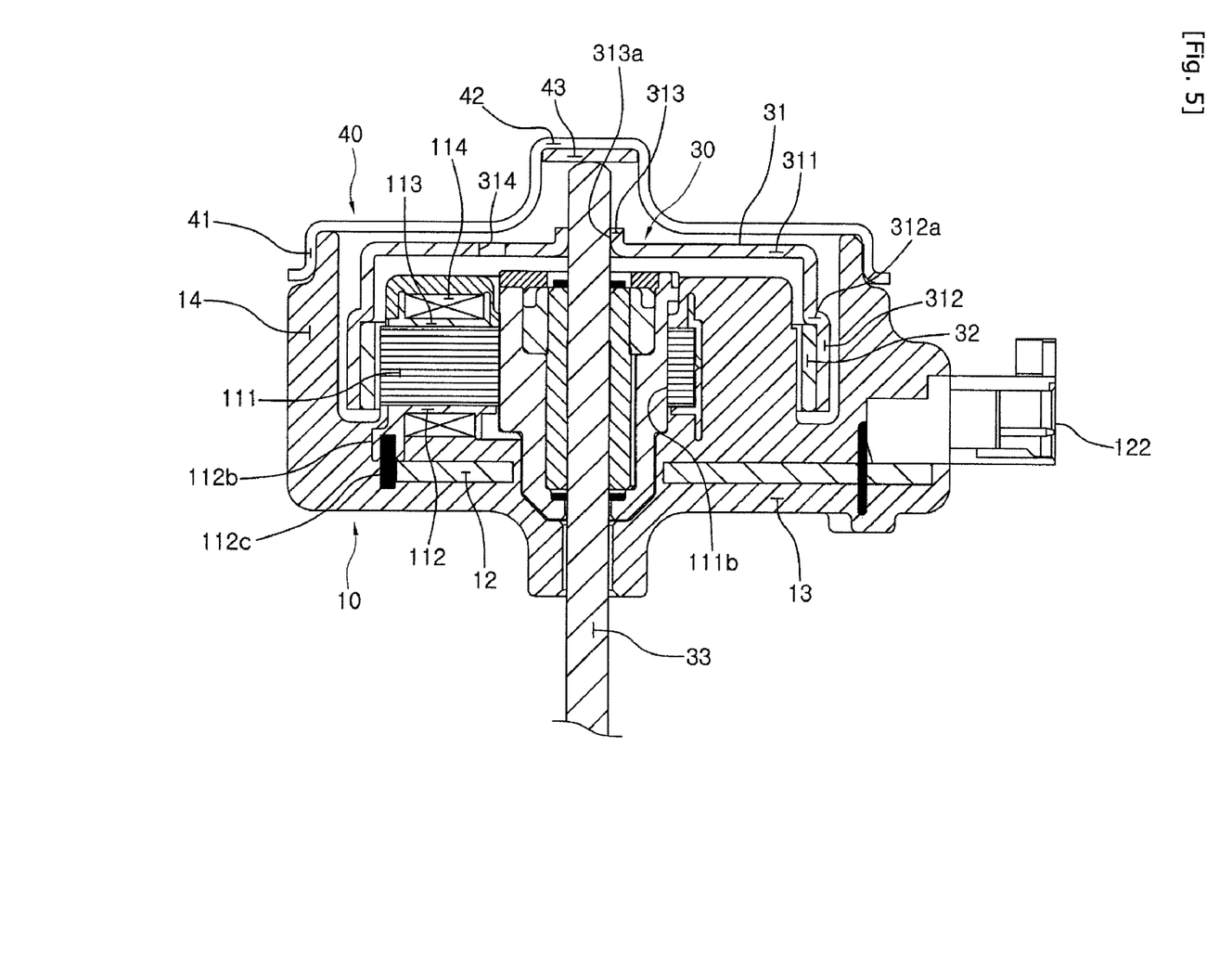
FIG. 5 illustrates a cross-sectional view of a fan motor for a refrigerator according to an embodiment of the present invention.
Figure 6:
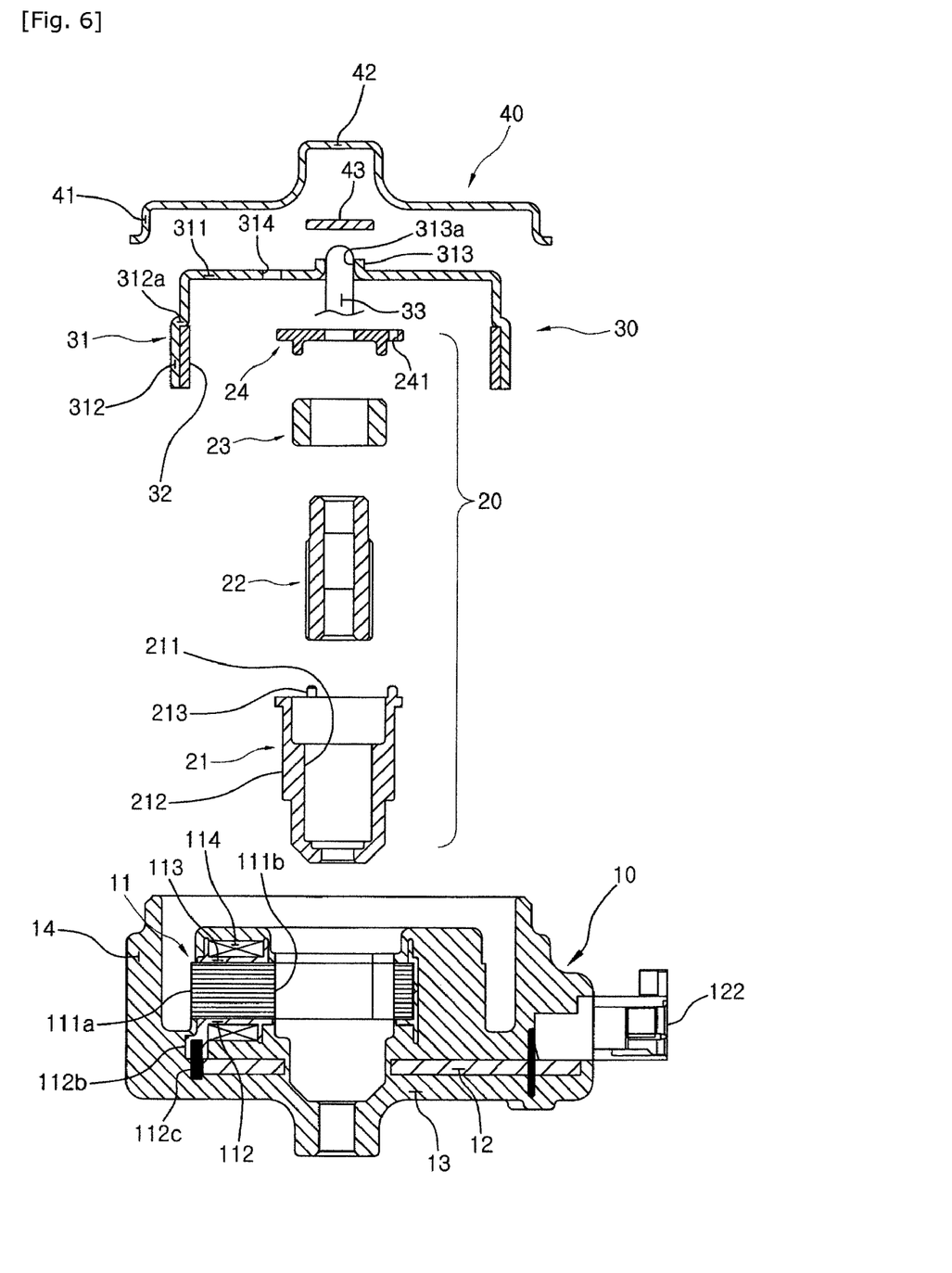
FIG. 6 illustrates a disassembled cross-sectional view of a fan motor for a refrigerator according to an embodiment of the present invention.

In the drawings, an embodiment is shown as: FIG. 1 illustrates a perspective view of a fan motor for a refrigerator according to an embodiment of the present invention; FIG. 2 illustrates a disassembled perspective view of a fan motor for a refrigerator according to an embodiment of the present invention; FIG. 3 illustrates a perspective view of a form that a stator made by insert molding for a molding unit, and a circuit board are assembled according to an embodiment of the present invention; FIG. 4 illustrates a disassembled perspective view of a form that a stator made by insert molding for a molding unit, and a circuit board are assembled according to an embodiment of the present invention; FIG. 5 illustrates a cross-sectional view of a fan motor for a refrigerator according to an embodiment of the present invention; and FIG. 6 illustrates a disassembled cross-sectional view of a fan motor for a refrigerator according to an embodiment of the present invention.

The present invention is related to a fan motor for a refrigerator. In the refrigerator, cool air is given forced circulation by the fan motor. In particular, the fan motor belongs to "outer rotor motor" with a rotor placed outside a stator. The motor is compact and has sufficient output.

Referring to the drawings, the fan motor according to the present invention comprises a stator 11, a molding unit 10 made by molding resin with a circuit board 12 inside, a shaft bearing unit 20 mounted inside the molding unit 10, a rotor 30 which rotates in the molding unit and is sustained by the shaft bearing unit 20, and an end cap 40 which covers opening parts of the molding unit 10 for covering the rotor 30.

The molding unit 10 is formed by insert molding method so that the stator 11 and the circuit 20 constitute one unit and plays a role as a motor housing for the shaft bearing unit 20 and the rotor 30 to be mounted like the role of the end cap 40.

The stator 11 has a shaft bearing unit mounting hole 111b in the center thereof and has core teeth 111a which protrude radially outward and a coil 114 is wound on the core teeth 111a. The stator 11 includes a stacked core 111, lower and upper insulators 112, 113, and a coil 114. As shown in the drawings, the stacked core 111 of the stator 11 has a shaft bearing unit mounting hole 111b in the center thereof and is formed by laminating a plurality of iron sheets with core teeth 111a protruded outward in a radial direction. A bearing housing 21 of the shaft bearing unit 20 is inserted into the shaft bearing unit mounting hole 111b. A rotating prevention channel 111c is formed at the inside surface of the hole 111b so that a rotation prevention protrusion 212 on the outer surface of the bearing housing 21 can be engaged and fixed.

The stacked core 111 is surrounded by the lower and upper insulator 112, 113 for insulation. The lower and upper insulator 112, 113 respectively cover lower and upper side of the parts such as the stacked core 111 and core teeth 111c that need to be insulated. As shown in the drawings, the insulators 112, 113 are assembled together from upper and lower direction respectively covering the stacked core 111.

The coil 114 is wounded on the core teeth 111b covered by the insulators 112, 113 in order to form magnetic fields in case of applying electric currents.

Meanwhile, the stator 11 in accordance with the above description is engaged with the circuit board 12 and is molded with the circuit board 12 together. In the present invention, for engagement between the stator 11 and the circuit board 12, a fixing pin 112a for being inserted and fixed into a fixing hole 124 formed on the edge of the circuit board 12. The fixing hole 124 protrudes downward on the bottom side of the lower insulator 112.

In addition, the coil 114 of the stator 11 is electrically connected to a circuit on the circuit board 12. For this, a terminal fixing protrusion 112b is formed on the bottom side of the lower insulator 112 and a terminal pin 112c electrically connected to the coil 114 is embedded and fixed downward at the fixing protrusion 112b. The terminal pin 112c is inserted into a terminal pin hole 125 formed on the circuit board 12 and is combined to make electrical connection with a circuit of the circuit board 12.

The circuit board 12 includes a circuit and a device which are electrically connected with the coil 114 of the stator 11, and also includes a terminal socket 122 having a terminal which is electrically connected to outer part of the motor. Referring the drawings, the circuit board 12 is a plate-like member having a center hole 123 whose size is correspondent to the size of the shaft bearing unit mounting hole 111b of the stator 11. The circuit board 12 is engaged with the bottom of the stator 11. For this, the edge of the circuit board 12 has a fixing hole 124 for a fixing pin 112a formed on the lower insulator 112 of the stator 12 to be inserted and fixed. Also, the circuit board 12 has a terminal pin hole 125 in which the terminal pin 112c that is formed on the lower insulator 112 of the stator 11 is inserted in order to make electrical connection with the circuit on the circuit board 12.

The stator 11 and the circuit board 12 is combined with each other by inserting the fixing pin 112a into the fixing hole 124 and the terminal pin 112c is inserted into the terminal pin hole 125. At this time, by insert molding the stator 11 and the circuit board 12 together form a molding unit 10. As shown in the drawings, the molding unit 10 is formed so that resin encloses the stator 11 and the circuit board 12. In the center of the molding unit 10, a shaft bearing unit mounting hole 111b is formed for a fix bearing unit 20 to be mounted therein. In order that the ends of the core teeth 111a of the stator 11 are opposite to a magnet ring 32 of the rotor 30, the ends are exposed outward in the direction of radius and are formed by insert molding. The molding unit 10 is also formed with resin by insert molding so that a terminal of the terminal socket 122 on the circuit board 12 is exposed outward from the molding unit 10. Also, the molding unit 10 has a base 13 and a side wall 14 to play a role as a motor housing. That is, the molding unit 10 is formed so that the circuit board 12 combined at one side of, specifically at the bottom of the stator 11 is embedded in the base 13. In the center of the base 13, a shaft insert hole 131 which is connected with the shaft bearing unit mounting hole 111b is formed. The molding unit 10 has a side wall 14 which extends upward and protruded from the outer edge of the base 13. The side wall 14 surrounds the ends of the core teeth 14 with a gap from the ends of the core teeth 14. The molding unit 10 has an opening on its upper part. This opening is covered and sealed by the end cap 40. Because of holding the shaft bearing unit 20 and the rotor 30 therein both the molding unit 10 and the end cap 40 act like a motor housing.

The shaft bearing unit 20 is for supporting a rotating shaft 33 of the rotor 30 and is inserted and fixed into the shaft bearing unit mounting hole 111b of the molding unit 10. As shown in the drawings, the shaft bearing unit 20 comprises a bearing housing 21, a bearing 22, an oil felt 23 and a housing cap 24.

The bearing housing 21 is mounted into the shaft bearing unit mounting hole 111b of the molding unit 10 and gives insulation between the bearing 22 and the stacked core 111 in the mounting hole 111b. With reference to the drawings, the bearing housing 21 has a bearing mounting hole 211 having a pipe-like shape penetrating vertically at the center of the bearing housing 21 and is inserted and fixed the mounting hole 111b of the molding unit 10. The bearing 22 is inserted into the bearing mounting hole 211 having an wider opening at the upper part and a narrower opening at the lower part thereof. The bearing 22 is inserted into the wider opening of the bearing mounting hole 211 and fixed in the bearing mounting hole 211. On the inside surface of the bearing mounting hole 211, there is a bumping protrusion in the vertical direction for the bearing in the mounting hole 211 not to idle. The upper side of the bearing mounting hole 211 of the bearing housing 21 is covered by a housing cap 24 when the bearing 22 and the oil felt 23 are holding inside the mounting hole 211. For covering the housing cap 24, the upper surface of the bearing housing 21 has a fixing pin 213 for being fixed forcibly into a fixing hole 241 of the housing cap 24. Meanwhile, the bearing housing 21 is inserted and mounted into the shaft bearing unit mounting hole 111b and the outer surface of the bearing housing 21 has a rotating prevention protrusion 212 for engaging with a rotating prevention channel 111c formed inside the mounting hole 111b.

The bearing 22 is for supporting a rotating shaft 33 of the rotor 30. As shown in the drawings, the bearing 22 is inserted and fixed into the bearing mounting hole 211 of the bearing housing 21. The outer surface of the bearing 22 has a groove for engaging with the bumping protrusion formed inside the bearing mounting hole 211.

The oil felt 23 is made of oil containing material and inserted and mounted into the bearing mounting hole 211 at the upper part of the bearing 22 inserted and fixed into the bearing mounting hole 211.

The housing cap 24 is combined at the upper part covering the upper opening of the bearing mounting hole 211. In order for engaging the housing cap 24 with the bearing housing 21, the fixing hole 241 for the fixing pin 213 to be inserted and fixed is formed on the housing cap 24.

The rotor 30 is for rotating inside the molding unit 10 and the end cap 40 and is supported by the shaft bearing unit 20. As shown in the drawings, the rotor 30 comprises a rotor housing 31, a magnetic ring 32 and a rotating shaft 33.

The rotor housing 31 has a cup shape formed by a base 311 and a side wall 312 made of iron. The inner surface of the side wall 312 of the rotor housing 31 has a magnetic ring 32 through an engaging end 321a for the magnetic ring 32 to be fixed at the right position. The rotating shaft 33 is positioned upright and fixed in the center of the base 311 of the rotor housing 31. Referring to the drawings, in the center of the base 311 of the rotor housing 31, a shaft fixing hole 313a is formed. The edge 313 of the shaft fixing hole 313a is drawing-processed in the upper direction, toward one side of the base 311 of the rotor housing 31. The rotating shaft 33 is inserted and fixed forcibly into the shaft fixing hole 313a.

On the base 311 of the rotor housing 31, there is a jig pin hole 314 around the shaft fixing hole 313a, which helps to easily align concentricity.

The rotor 30 is inserted into the gap between the side wall 312 of the molded unit 10 and the ends of the core teeth 111a of the stator 11 so that the magnetic ring 32 is positioned opposite to the ends of the core teeth 111a of the stator 11 with a gap. The rotating shaft 33 is inserted and penetrated into the shaft inserting hole 131 of the molding unit 10 and is supported by the bearing 22 of the shaft bearing unit 20.

The end cap 40 is engaged with the edge of the side wall 14 of the molding unit 10 covering the rotor 30. As shown in the drawings, the end cap 40 is combined with the molding unit 10 by the upper edge of the side wall of the molding unit being inserted into the engaging side wall 41 whose end is bent.

The rotating shaft 33 of the rotor 30 is protruded upward from the base 311 of the rotor housing 31. A shaft end receptive concave 42 is formed in the center and at the bottom of the end cap 40 and accepts the protruded end part of the rotating shaft 33.

In addition, a shaft end bearing washer 43 is accepted and mounted in the shaft end receptive concave 42 for supporting the end of the rotating shaft 33.

The fan motor for a refrigerator described above is just an embodiment for enabling the present invention. Therefore, the description should not be interpreted to confine the range of the invention. Various substitutions and modifications can be easily made to the invention by those skilled in the art without departing from the scope and spirit of the appended claims.

INDUSTRIAL APPLICABILITY

The present invention may be applied as a fan motor for a refrigerator that has a compact size and sufficient output with the advantages that a stator is integrated and made by molding and a rotor is employed outside the stator.

The invention claimed is:

1. A fan motor for a refrigerator in which cool air is circulated by force, the fan motor comprising:
    a molding unit comprising:
        a stator having a shaft bearing unit mounting hole in the center thereof and core teeth which protrude radially outward so that a coil is wound thereon; and
        a circuit board having a circuit and a device which are electrically connected to the coil of the stator;
        wherein the stator and the circuit board having a terminal socket are integrally molded out of resin; and ends of the core teeth are exposed outwardly in the radial direction;
        and wherein a base is formed on one side of the stator;
    a shaft insertion hole connected to the shaft bearing unit mounting hole is formed in the center of the base; a side wall is formed protrusively from the edge of the base to surround the ends of the core teeth with a gap; and a terminal of the terminal socket is exposed outside the side wall;
    a shaft bearing unit inserted and fixed in the shaft bearing unit mounting hole;
    a rotor having a magnetic ring formed on the inner surface of a cup-shaped rotor housing, and a rotating shaft fixed at the bottom center of the rotor housing;
    wherein the side wall of the rotor housing is inserted in the gap between the side wall of the molding unit and the ends of the core teeth of the stator so that the magnetic ring is positioned opposite to the ends of the core teeth of the stator with a gap; and
    wherein the rotating shaft penetrates through the shaft insertion hole and thereby the rotor is supported by the shaft bearing unit; and
    an end cap whose edge is connected to the upper part of the side wall of the molding unit covering the rotor.

2. The fan motor as defined in claim 1, wherein the stator has a stacked core made by stacking a plurality of lamination sheets with the core teeth protruded outward radially; and
    wherein the stacked core is surrounded by an insulator and the coil is wound on the core teeth surrounded by the insulator.

3. The fan motor as defined in claim 2, wherein a fixing pin is formed downward at the bottom of the insulator and a fixing hole is formed on the circuit board in order for the fixing pin to be inserted; and
    wherein the stator and the circuit board are integrally resin molded with the fixing pin inserted into the fixing hole.

4. The fan motor as defined in claim 3, wherein the insulator comprises an upper insulator and a lower insulator and the upper insulator and the upper insulator covers the stacked core upward and downward respectively.

5. The fan motor as defined in claim 3, wherein the insulator further comprises:
    a terminal pin which is electrically connected to the coil and is protruded downward; and
    the circuit board further comprises a terminal pin hole for the terminal pin to be inserted and for electrical connection with the circuit of the circuit board;
    wherein the stator and the circuit board are integrally resin molded with the terminal pin inserted into the terminal pin hole.

6. The fan motor as defined in claim 1, wherein the shaft bearing unit further comprises:
    a bearing housing having a bearing mounting hole penetrated vertically at the center; and a bearing inserted and fixed into the bearing mounting hole of the bearing housing.

7. The fan motor as defined in claim 6, wherein the shaft bearing unit further comprises an oil felt inserted and fixed into the bearing mounting hole from the upper direction of the bearing.

8. The fan motor as defined in claim 7, wherein the bearing mounting hole has an wider opening at the upper part and a narrower opening at the lower part; and the shaft bearing unit further comprises a housing cap which is combined at the upper part covering the upper opening of the bearing mounting hole.

9. The fan motor as defined in claim 8, wherein a fixing pin is protruded and formed on one surface of the upper of the bearing housing and the bottom of the housing cap;

a fixing hole for the fixing pin to be fixed forcibly formed on the other surface of the upper of the bearing housing and the bottom of the housing cap.

10. The fan motor as defined in claim 6, wherein a rotation prevention protrusion is formed and elongated vertically on one of the inner surface of the bearing mounting hole and the outer surface of the bearing; and a rotation prevention channel is formed and elongated vertically for engaging the rotation prevention protrusion on the other of the inner surface of the bearing mounting hole and the outer surface of the bearing.

11. The fan motor as defined in claim 6, wherein a rotation prevention protrusion is formed and elongated vertically on one of the inner surface of the shaft bearing unit mounting hole and the outer surface of the bearing housing; and a rotation prevention channel is formed and elongated vertically for engaging the rotation prevention protrusion on the other of the inner surface of the shaft bearing unit mounting hole and the outer surface of the bearing housing.

12. The fan motor as defined in claim 1, wherein the side wall of the rotor housing comprises an engaging end for the magnetic ring to be hung and engaged.

13. The fan motor as defined in claim 1, wherein a shaft fixing hole is formed at the bottom center of the base of the rotor housing; the edge of the shaft fixing hole is drawing-processed in one direction; and the rotating shaft is inserted and fixed forcibly into the shaft fixing hole.

14. The fan motor as defined in claim 1, wherein a jig pin hole is formed on the base of the rotor housing.

15. The fan motor as defined in claim 1, wherein the end cap is combined with the molding unit by the upper edge of the side wall of the molding unit being inserted into the engaging side wall whose end is bent.

16. The fan motor as defined in claim 1, wherein a shaft end receptive concave is formed at the bottom center of the end cap and accepts the protruded end part of the rotating shaft.

17. The fan motor as defined in claim 16, wherein a shaft end bearing washer is accepted and mounted in the shaft end receptive concave for supporting the end of the rotating shaft.

\* \* \* \* \*